United States Patent Office 2,770,265
Patented Nov. 13, 1956

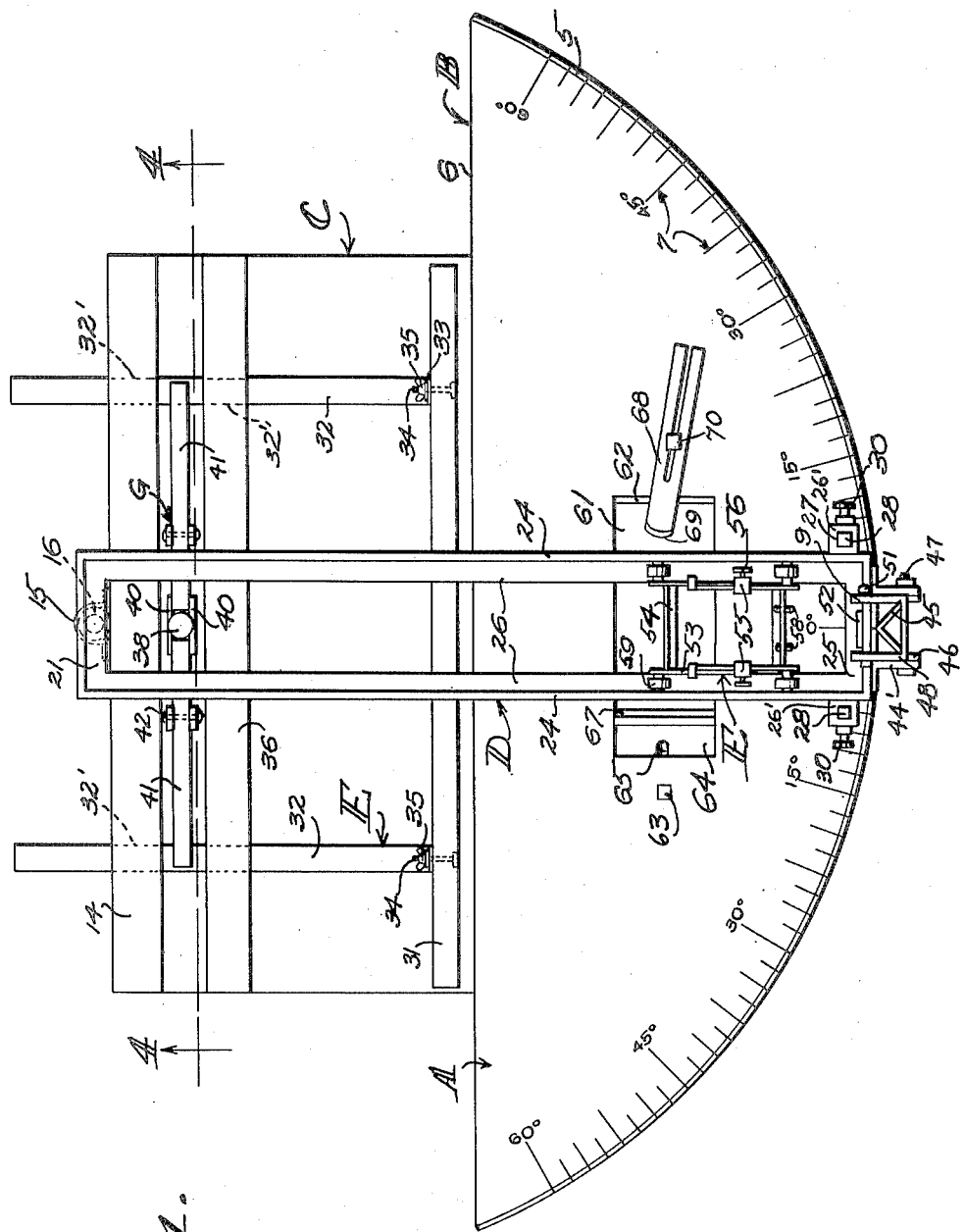

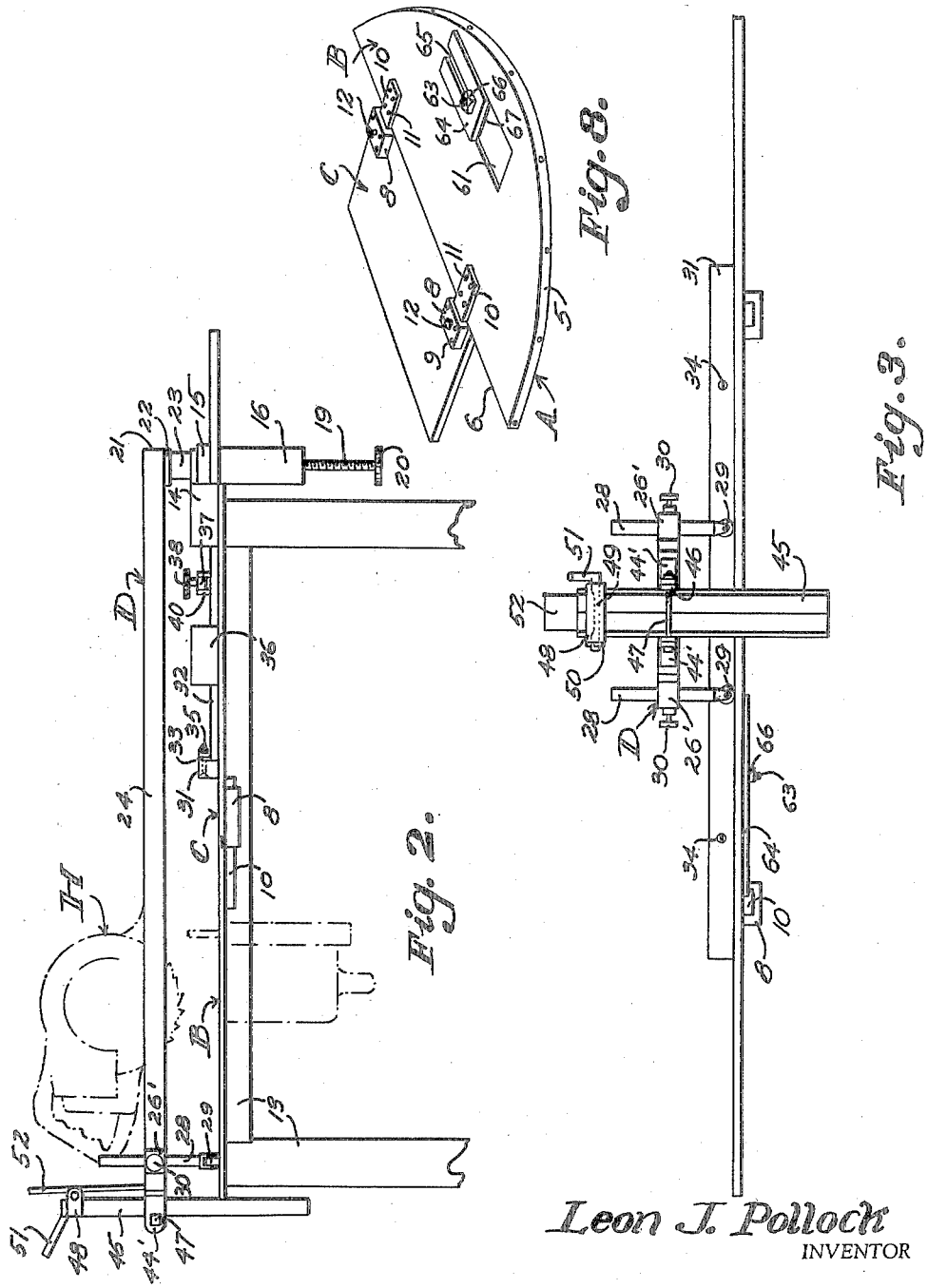

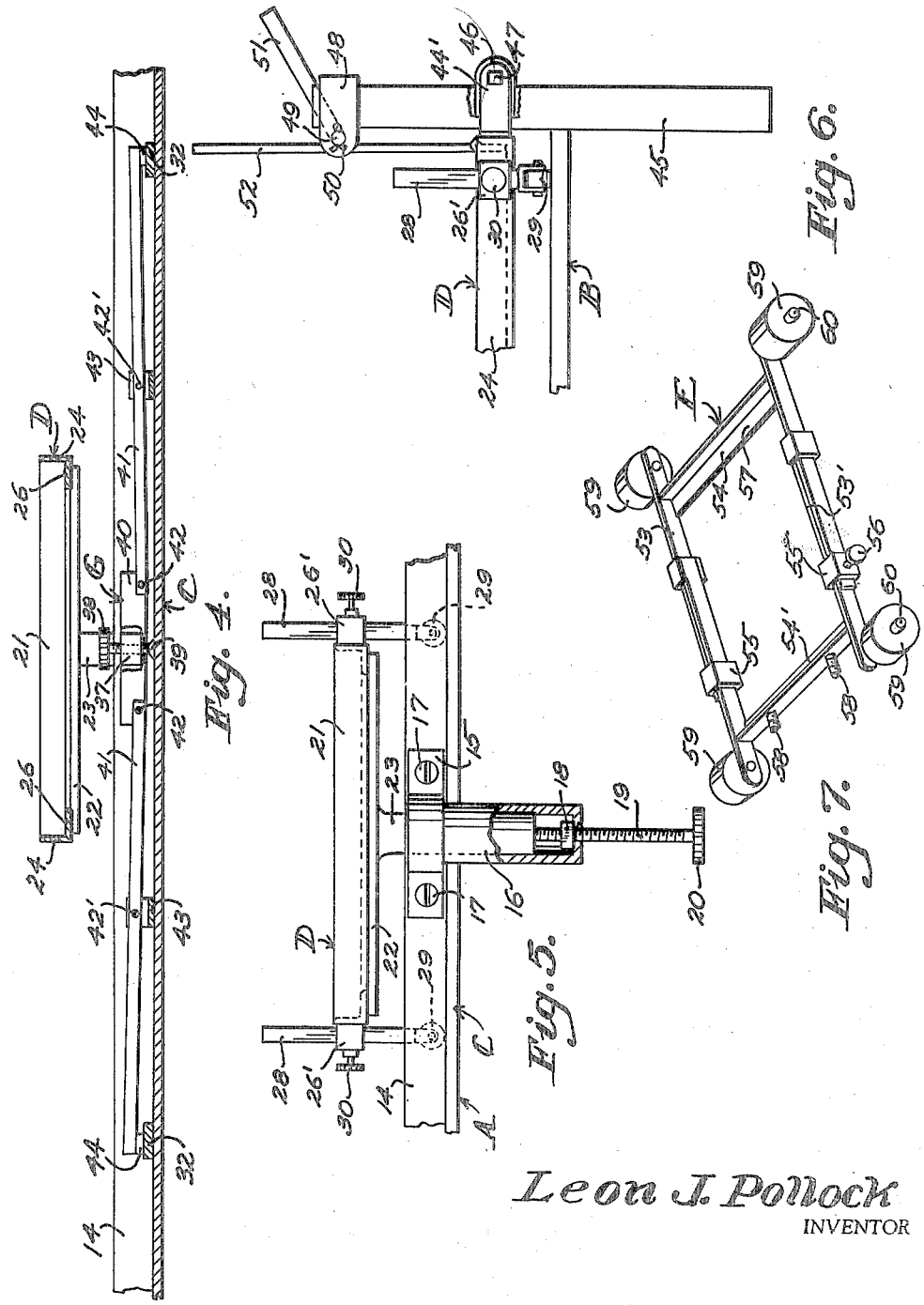

2,770,265

COMBINATION GUIDE AND PORTABLE SUPPORT FOR POWER SAWS

Leon J. Pollock, Albany, Ga.

Application July 28, 1953, Serial No. 370,719

3 Claims. (Cl. 143—6)

Generically this invention relates to woodworking, but it is more particularly directed to a portable miter-work surface and power hand saw supporting structure adapted for movement over said surface.

One of the principal objects of this invention is the provision of a portable power hand saw miter-work surface, adapted to be placed upon a suitable support, and including an arcuate front section bearing calibrations along its arcuate edge and a rear rectangular work surface section forming a continuation of the front surface, of less length and detachably secured to said front section, and to which the power hand saw carriage track is pivotally attached, said rear section constituting a supporting surface for an adjustable fence guide structure for use when ripping, plowing or rabbeting, and as a guide when cross cutting at various angles or dadoing.

Another principal object of this invention is the provision of a saw carriage track and guide having one end pivotally mounted at the rear edge of the rectangular rear work surface section and its free end adjustably roller supported for travel contiguous the arcuate edge calibrations, the construction and arrangement of the work surface, calibrations, carriage track and adjustable fence guide and locking mechanism being such that every wooden piece going into the construction of an ordinary house can be readily sawed by this demountable portable device, with the exception of the heavy building frame timbers.

One of the disadvantages of the type of miter box and power hand saw devices heretofore in use, is that, each device can be used only with a particular make of saw, and, therefore, one of the principal objects of this invention is the provision of a unique saw carriage adjustable to accommodate any type and size of power hand saw now being manufactured.

Another important object of this invention is the provision of a miter work surface having calibrations contiguous its arcuate edge, a hand saw carriage and a track therefor, said track being shiftable with respect to said work surface to permit the saw to be moved in sawing direction at various sawing angles with respect to the work, the construction and arrangement of the work surface and saw carriage track being such that the carriage and track can be moved to inoperative position from the work surface and the power hand saw mounted beneath the work surface with the saw blade projecting above said surface for use as a stationary work surface saw, with the work being pushed in sawing direction for ripping.

A further object of this invention is the provision of a stationary fence guide for use when cross sawing at various angles and dadoing, and a removable and adjustable fence guide structure for use when ripping, plowing or rabbeting, mounted on said rear work surface section.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a top plan view of the device.
Fig. 2 is a side elevation of Fig. 1.
Fig. 3 is an end elevation of Fig. 1.
Fig. 4 is a cross sectional view taken on line 4—4 of Fig. 1.
Fig. 5 is an enlarged fragmentary rear end view of Fig. 1 showing the carriage track elevating means and pivotal mounting.
Fig. 6 is an enlarged side elevation of the carriage track clamp structure.
Fig. 7 is an enlarged perspective view of the portable power saw supporting carriage.
Fig. 8 (Sheet 2) is a reduced perspective view of the under side of the work surface sections showing the interlocking members, and the adjustable hand saw securing means.

In the illustrated embodiment characterizing this invention there is shown a miter work surface structure A comprising a front section B and a rear section C. The front section B is formed with an arcuate front edge 5 and a rear straight edge 6, and along its arcuate edge 5 it is provided with calibrations 7 for a purpose directly more fully appearing.

Spaced inwardly from the ends of section B and engaging the straight edge 6 is the rectangular work surface section C, forming a surface continuation of section B and detachably secured thereto by the channel members 8 secured to the under surface of section C by screws 9 (Fig. 8) and adapted to receive the tongue member 10 secured to section B by screws 11, the said sections B and C being rigidly interlocked by tightening the thumb screws 12. The work and saw supporting surface structure A is adapted in operation to be placed on any desired support, such as for example, the supporting frame structure 13 (Fig. 2), or any suitable support.

Mounted on work surface section C at its rear edge is, in the present instance, a 2 x 4 beam 14 on which beam, centrally of its length, is mounted a strap member 15 (see Figs. 1 and 5, for example), securing a cylinder member 16 at its upper end to said beam 14 by screws 17 and to which cylinder the strap member 15 may be welded if desired. A threaded nut 18 is welded or otherwise secured to the bottom of the cylinder interiorly thereof, and a threaded rod 19 extends through the cylinder bottom and threaded nut 18, which threaded rod 19 is actuated by a knurled head 20. Welded or otherwise secured to the rear end 21 of the saw carriage track D is an elongated head 22, which is welded to an upper or outer end of an elevator and pivot shaft 23, which shaft is mounted reciprocally and rotatably in the cylinder 16 on the upper end of rod 19, so that actuation of the rod by the knurled head 20 elevates and lowers said carriage track D.

The carriage track D is a rectangular frame formed of the side angle bars 24 (see Fig. 1) connected at their ends by the similar end sections 21 and 25, the horizontal flanges 26 of these side angle bars 24 forming the track surfaces for the saw carriage E which will be directly more fully described. Adjacent to the front end 25, the side bars 24 are formed with the welded lateral lugs 26' formed with square apertures 27 in which are adapted to be adjustably mounted shanks 28, carrying at their lower ends caster rollers 29 (see Figs. 2 through 5), said shanks being adjustably secured by thumb screws 30.

Mounted on the rectangular rear work surface C is an adjustable fence guide structure E including a front fence guide member 31 (Fig. 2) mounted on a pair of rearwardly extending spaced parallel supporting bars 32 detachably connected to member 31 by angle plates 33 suitably secured to members 32 and to fence member 31 by bolts 34 and wing nuts 35. Spaced forwardly from the rear anchor beam 14 is a suitably secured stationary fence guide bar 36. The bars 32 are freely slidable in the guide channels 32' formed in the members 14 and 36 so as to permit adjustment of the fence guide 31 when ripping, plowing or rabbeting, and the fence structure E may be entirely removed and the fence 36 used when cross cutting at various angles or when dadoing. In order to secure the fence guide 31 in adjusted position, a locking mechanism G (Fig. 4) is provided and mounted intermediate beam 14 and stationary fence 36 in locking and releasable engagement with said members 32. Said mechanism G includes a block 37 having a threaded bore through which extends a threaded thumb screw 38 having a base 39 adapted to seat on work surface C, or if desired said base 39 could be a separate pivot base for the screw 38. Parallel plates 40 are welded centrally of their length to opposite sides of block 37 and the inner ends of arms 41 are pivoted by pins or bolts 42 intermediate the ends of plates 40, and said arms 41 are fulcrumed in the recessed blocks 43 on pins or bolts 42' suitably secured to the rear work surface C. The free ends of arms 41 are provided with feet elements 44, clampingly engageable with arms 32 when thumb screw 38 is actuated to raise block 37 and the inner ends of arms 41 to lock the fence guide bar 31 in adjusted position.

Mounted on the end 25 of track D are the spaced L-shaped angle members 44' between which extends the V-shaped angle marker member 45 having welded thereon clips or ears 46 rotatably mounted on the bolt 47 interconnecting and supported by members 44', and mounted on and welded to the upper end of said marker 45 is the substantially U-shaped clip 48 in the end of which is rotatably mounted a locking rod 49 (Fig. 6) secured by a cotter pin 50, and having a bent or eccentric portion as shown in dotted lines in Fig. 3, and terminating at the opposite side of said clip in a handle member 51 adapted to actuate said locking rod into locking engagement with the vertical steel bar 52 having its lower end welded to the end 25 of said track D to lock said track by reason of the locking engagement of said locking rod 49 with locking bar 52 actuating the angle marker 45 about bolt 47 which forces said angle marker into clamping and locking engagement with the arcuate edge of work surface B, and securing said track at the angle the work is desired to be sawed as shown by the calibrations carried by the work support surface and setting of said marker in accordance therewith. This enables at a glance the setting and locking of the hand saw carriage track D at any desired calibration angle designation throughout the length of said work surface arcuate edge and that of the calibrations contiguous said edge, as will be well understood.

The saw carriage F (see Figs. 1 and 7), includes a pair of spaced side bar sections 53 connected by a welded angle bar end member 54 spaced inwardly from the ends of the side sections, and a similar pair of side sections 53' are connected by a similar end angle bar 54' spaced from their ends, and bar sections 53 are adapted for overlying slidable engagement with side bars 53'. Said bar sections are adjustably supported by the adjustable collars 55 carrying thumb screws 56 for locking engagement with the ends of side members 53', and the ends of side bars 53 are secured in collars 55', so by loosening set screws 56 the said overlying side bar sections are extensibly adjustable to accommodate the bases of various sizes of power hand saws. A power hand saw H (Fig. 2) is adapted to be mounted on carriage F with its base seating on the seats 57 of the end bars 54 and 54' and secured by the adjustable elements 58 or other suitable fastening means. The carriage F is provided with track engaging rollers 59 rotatably mounted on axle pins 60 projecting from the free ends of said sections.

It will be apparent that when the work is in position on the work surface, and when the carriage F carrying power saw H is positioned on track D and the marker 45 set and locked at the desired calibration angle indicated, the carriage travels along said track as the saw is advanced with respect to the work, as will be well understood. As hereinbefore stated to adjust the track D to accommodate different thicknesses of work it is only necessary to actuate rod 19 by knurled head 20 to elevate the track and the front end is correspondingly elevated by adjusting the shanks 28 so that the track will be supported at the proper level on the rollers 29, which, as the track is moved over the work surface, will travel in an arcuate path adjacent the arcuate calibrated edge of the miter work surface and without further adjustment.

The miter work surface B substantially central thereof is formed with rectangular opening 61 recessed at one end to provide a seat 62 below the work surface and spaced slightly from the opposite end of the opening 61 is a bolt 63 the head of which is embedded in the work surface B, and secured by said bolt to the under or opposite surface of work surface B, is an adjustable block 64 having a bolt-receiving slot 65 through which extends the bolt 63 secured by a nut 66. This block is adapted to adjust the length of the opening 61 and is formed at the inner end with a recessed seat 67.

When it is desired to rip saw it is only necessary to remove track D from overlying position with respect to the work surface and remove the power hand saw H from the carriage F and secure it in inverted position in opening 61 with the saw blade extending above the miter work surface B and with one end of its base in supporting engagement with seat 62 and adjusting block 64, which is secured in locking position by tightening the nut 66 on bolt 63, which converts the saw into a stationary ripping saw for engaging the work on work surface B when the fence guide 31 has been adjusted with respect to the work to be rip sawed.

Mounted on the work surface B in alignment with the saw blade is an adjustable slotted member 68 having a bevel end 69 adapted for engagement between predetermined saw teeth to hold the saw in connection with the sharpening of the saw teeth, said block being mountable on surface B only when sharpening of the teeth is desired, said member being secured by bolt 70.

It is thought that the operation of the device will be sufficiently clear from the above description to render further explanation unnecessary.

It will be apparent that I have provided a work surface adapted to be placed upon a suitable support, the work surface comprising an arcuate front section calibrated adjacent to its arcuate edge, and a rear section attachably secured to the front section and of less length adapted to adjustably support a fence guide structure, locking means for said structure, and a supporting track for a carriage for a power-actuated saw, which track is pivotally mounted on said section at its rear edge and which is movable over the work surface, and having a free end roller-supported to travel along said calibrations, marker means carried by the front end of said track, and coacting locking means carried by the marker means and end of the track for effecting locking engagement of the marker means and work surface at any desired point in respect to the calibrations. The construction and arrangement of the working surface and mechanisms carried thereby are such as to enable the saw to function for cross-sawing when the saw is mounted on the carriage and as a table saw when the saw is mounted on the under-surface of said work surface, the said surface and components of the device being readily demountable for compact arrangement for easy portability, said device being simple in construction, manufacturable at a minimum of cost, and efficient for the purposes intended.

Although in practice I have found that the form of my invention illustrated in the accompanying drawings and referred to in the above description as the preferred embodiment, is the most efficient and practical; yet realizing that conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described the invention, what I desire protected by Letters Patent is as set forth in the following claims:

1. A work surface for portable power operated hand saws, which is adapted to be placed on a support, and comprises an arcuate front section having an arcuate front edge, and a straight rear edge, angular calibrations along the arcuate front edge, a rear rectangular work surface section defining a continuation of the arcuate front section but being of less length than the front section and having a straight forward end and a straight rear end, the forward end engaging the straight rear edge of the front section in even and level engagement therewith for providing with the front section a continuous and uninterrupted flat work surface, locking means detachably interlocking the rear section to the front section, a power-operated hand saw carriage tarck extending across both the rear section and the front section, the said rear rectangular section having a rear edge parallel to the rear straight edge of the arcuate front section, a beam mounted on the rear straight end of the rectangular section, means pivotally attaching the carriage track to the rear edge of the rear rectangular section centrally thereof for enabling angular rotation of the carriage track relative to the rear and front sections for sawing a workpiece at a known selected angle indicated by the calibrations on the said arcuate front edge, the pivotally attaching means comprising a depending cylinder having an upper end secured to the beam, a pivot shaft depending from the rear end of the carriage track member and receivable in the cylinder, the cylinder having a substantially closed bottom end but provided with an opening therethrough, a threaded rod extending through the bottom end of the cylinder, a threaded nut mounted in the cylinder in threaded engagement with the rod, the rod having an operating head for effecting elevation of the track member, adjustable roller track supporting means engageable with the calibrated arcuate front edge of the front section, a substantially V-shaped angle marker carried by the carriage track registering with the calibrations, locking means for releasably locking the carriage track to the arcuate front edge of the front section at a selected angular adjustment, and an adjustable fence guide structure mounted on the rectangular rear section of the work surface for use when a saw mounted on the carriage track is being employed for ripping, plowing and rabbeting operations, selectively, on a workpiece, and as a guide when the saw is being used in cross-cutting a workpiece at various angles.

2. The construction as defined in claim 1 wherein the marker is vertically pivoted on the said carriage track and the locking means include a vertical bar having its lower end welded to the carriage track, a U-shaped clip carried by the marker, a locking rod rotatably mounted in the clip adjacent to the said vertical bar, and means for moving the locking rod into clamping engagement with the vertical bar for pressing the latter into locking engagement with the arcuate front edge of the said front section.

3. The structure defined by claim 1 wherein the adjustable fence guide structure comprises a front work engaging guide member, a pair of rearwardly extending spaced parallel supporting bars for the guide member, means detachably connecting the guide member to the supporting bars, a stationary guide bar mounted rearwardly of and substantially parallel to, the guide member having means enabling slidable movement through it of the parallel supporting bars for enabling selective adjustment of the front guide member in conformity with a selected sawing operation on a workpiece, and means for locking the front guide member in adjusted position relative to said stationary guide bar, the locking means including a block and oppositely extending pivotally mounted first class lever arms having free ends engageable with the slidable parallel bars, and means in connection with said block for causing the block to swing the said arms to move the free ends of the arms into clamping engagement with the parallel bars.

References Cited in the file of this patent

UNITED STATES PATENTS

| | | |
|---|---|---|
| 133,577 | Finn | Dec. 3, 1872 |
| 1,331,415 | Civitts | Feb. 17, 1920 |
| 1,457,492 | Bloodgood | June 5, 1923 |
| 1,540,388 | Crowe | June 2, 1925 |
| 1,618,341 | Howland | Feb. 22, 1927 |
| 1,828,043 | Hedgpeth | Oct. 20, 1931 |
| 1,832,283 | Earhart | Nov. 17, 1931 |
| 1,842,630 | Rodning | Jan. 26, 1932 |
| 2,502,640 | Coleman | Apr. 4, 1950 |
| 2,589,554 | Killian | Mar. 18, 1952 |
| 2,595,322 | Avery | May 6, 1952 |
| 2,612,914 | Reynolds | Oct. 7, 1952 |
| 2,630,146 | Van Tuyl | Mar. 3, 1953 |
| 2,633,162 | Neuenschwander | Mar. 31, 1953 |